United States Patent
Bestgen et al.

(10) Patent No.: US 7,958,158 B2
(45) Date of Patent: Jun. 7, 2011

(54) AGGREGATING DATABASE QUERIES

(75) Inventors: Robert Joseph Bestgen, Rochester, MN (US); Wei Hu, Madison, WI (US); Shantan Kethireddy, Chicago, IL (US); Andrew Peter Passe, Rochester, MN (US); Ulrich Thiemann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 12/142,182

(22) Filed: Jun. 19, 2008

(65) Prior Publication Data

US 2009/0319474 A1    Dec. 24, 2009

(51) Int. Cl.
*G06F 7/00* (2006.01)
(52) U.S. Cl. ........ 707/799; 707/718; 707/719; 707/720; 707/721
(58) Field of Classification Search .................. 707/799, 707/718–721
See application file for complete search history.

(56) References Cited

U.S. PATENT DOCUMENTS

| 5,493,670 A * | 2/1996 | Douglis et al. ............... 713/324 |
| 2007/0100793 A1 * | 5/2007 | Brown et al. ................... 707/2 |

OTHER PUBLICATIONS

"Reducing Energy Consumption of Queries in Memory Resident Database Systems" Pisharath et al., Copyright 2004 ACM.*
U.S. Patent Application filed Jun. 19, 2008, "Grouping Predicted Database Queries" by Robert Joseph Bestgen et al, IBM.

* cited by examiner

*Primary Examiner* — Apu M Mofiz
*Assistant Examiner* — Cindy Nguyen
(74) *Attorney, Agent, or Firm* — Patterson & Sheridan, LLP

(57) ABSTRACT

Embodiments of the invention provide techniques for aggregating database queries for energy efficiency. In one embodiment, queries received by a DBMS are aggregated and staged according to hard-disk drives required for query execution. Each group of queries accessing a given drive may be dispatched for execution together. Further, the queries received by a DBMS may be matched to patterns of previously received queries. The matching patterns may be used to predict other queries which are likely to be received by the DBMS. The received queries may be staged to be dispatched with the predicted queries. By aggregating queries to be executed, access to each hard-disk drive may be optimized, thus reducing the overall energy consumption required for executing the queries.

20 Claims, 6 Drawing Sheets

US 7,958,158 B2

AGGREGATING DATABASE QUERIES

BACKGROUND OF THE INVENTION

1. Field of the Invention

The invention generally relates to computer databases systems. More particularly, the invention relates to techniques for aggregating database queries for energy efficiency.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc.), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

A user of a relational database may compose a query to specify tables and columns to retrieve data from. A query may also specify how the data is to be joined, as well as conditions (predicates) that must be satisfied for a particular data item to be included in a query result table. Current relational databases require that queries be composed in query languages. A commonly used query language is Structured Query Language (SQL). However, other query languages are also used. Once composed, a query is executed by the DBMS.

SUMMARY OF THE INVENTION

One embodiment of the invention provides a computer-implemented method, comprising: receiving a database query; determining at least one data element required for executing the database query; identifying, from a plurality of storage devices, a storage device storing the determined at least one data element; and adding the query to a first queue of a plurality of queues each having a plurality of queued queries, each of the queues having a predefined association with a respective storage device of the plurality of storage devices, and wherein each of the queued queries of a given of one of the queues requires one or more data elements stored in the respective storage device in order to be executed, and wherein each queued query is received during a specified time period, wherein the specified time period is selected according to an energy consumption objective. The method also comprises, after the specified time period: dispatching the plurality of queued queries from the first queue; retrieving, from the respective storage device, data elements required for executing the dispatched queries; and executing the dispatched queries, using the retrieved data elements as inputs.

Another embodiment of the invention provides a computer readable storage medium containing a program which, when executed, performs an operation. The operation comprises: receiving a database query; determining at least one data element required for executing the database query; identifying, from a plurality of storage devices, a storage device storing the determined at least one data element; and adding the query to a first queue of a plurality of queues each having a plurality of queued queries, each of the queues having a predefined association with a respective storage device of the plurality of storage devices, and wherein each of the queued queries of a given of one of the queues requires one or more data elements stored in the respective storage device in order to be executed, and wherein each queued query is received during a specified time period, wherein the specified time period is selected according to an energy consumption objective. The operation also comprises, after the specified time period: dispatching the plurality of queued queries from the first queue; retrieving, from the respective storage device, data elements required for executing the dispatched queries; and executing the dispatched queries, using the retrieved data elements as inputs.

Yet another embodiment of the invention includes a system, comprising: a database; a processor; and a memory containing a program. When executed by the processor, the program is configured to perform an operation, comprising: receiving a database query; determining at least one data element required for executing the database query; identifying, from a plurality of storage devices, a storage device storing the determined at least one data element; and adding the query to a first queue of a plurality of queues each having a plurality of queued queries, each of the queues having a predefined association with a respective storage device of the plurality of storage devices, and wherein each of the queued queries of a given of one of the queues requires one or more data elements stored in the respective storage device in order to be executed, and wherein each queued query is received during a specified time period, wherein the specified time period is selected according to an energy consumption objective. The operation also comprises, after the specified time period: dispatching the plurality of queued queries from the first queue; retrieving, from the respective storage device, data elements required for executing the dispatched queries; and executing the dispatched queries, using the retrieved data elements as inputs.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
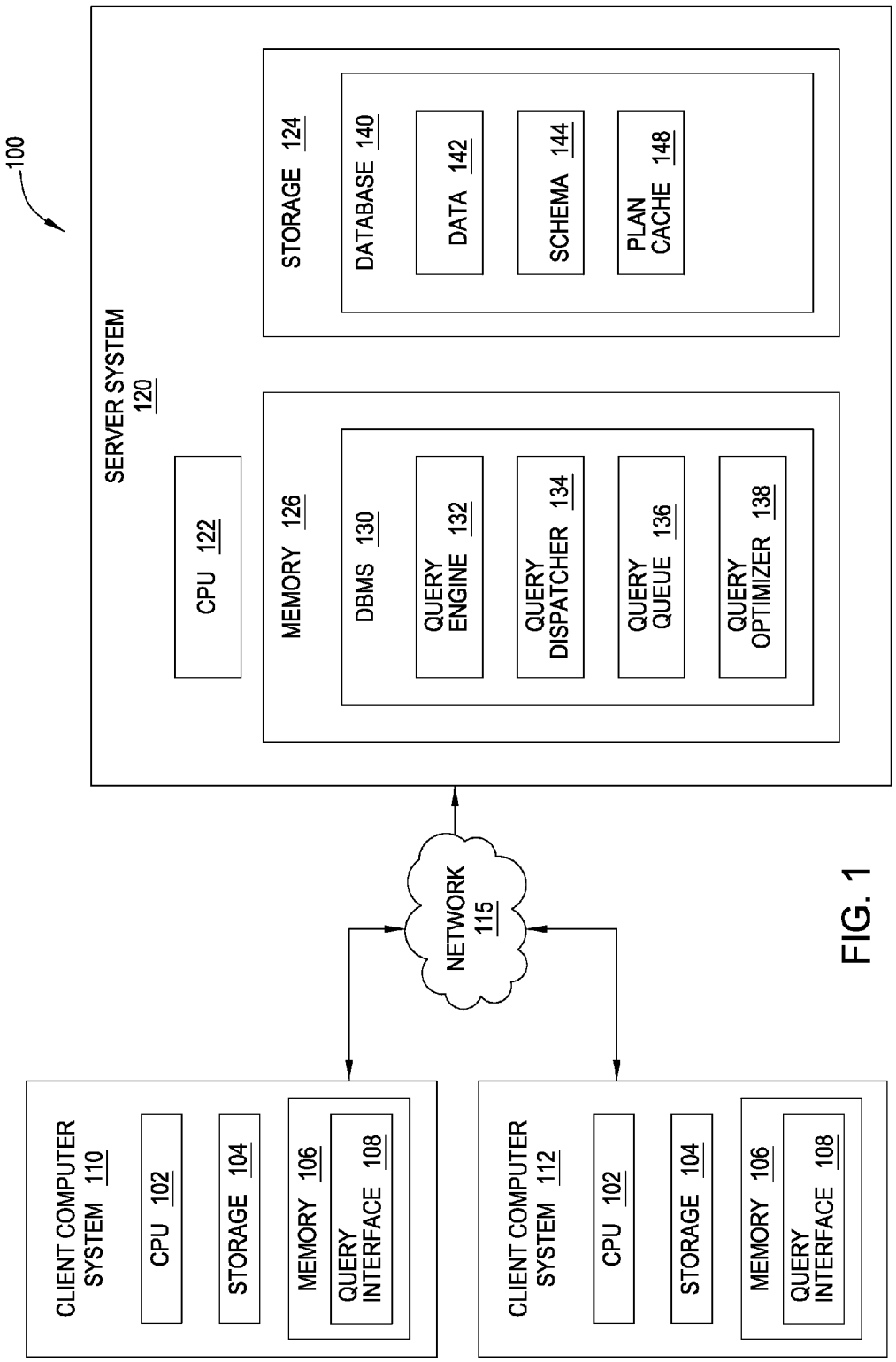
FIG. 1 is a block diagram that illustrates a client server view of computing environment, according to one embodiment of the invention.

A relational database management system (DBMS) may receive multiple queries for processing (i.e., query execution). Each query may require data stored in particular database elements, such as tables, indexes, etc. The database elements may be stored on multiple storage drives included in a single computer, or may be stored in multiple storage drives included in multiple computers. In some situations, processing multiple queries may require access to multiple storage drives. Also, as additional queries are received by the DBMS, various storage drives may be accessed to retrieve required data. In such situations, multiple drives may be active at any given time, thus resulting in a continuous consumption of electrical energy in order to spin the multiple drives. Further, if multiple drives are accessed at the same time, the heat generated within a computer system may increase, thus requiring electrical energy for cooling fans (or other cooling systems).

Embodiments of the invention provide techniques for aggregating database queries for energy efficiency. In one embodiment, queries received by a DBMS are aggregated and staged according to hard-disk drives required for query execution. Each group of queries accessing a given drive may be dispatched for execution together. In this manner, access to each hard-disk drive may be optimized, thus reducing the overall energy consumption required for executing the queries. In another embodiment, queries received by a DBMS may be matched to patterns of previously received queries. The matching patterns may be used to predict other queries which are likely to be received by the DBMS. The received queries may be staged for dispatching with queries that are predicted to be received. By increasing the number of queries aggregated, the overall energy consumption required for executing the queries may be reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes two client computer systems 110 and 112, network 115 and server system 120. The two client computer systems 110 and 112 represent any number of client computers that may connect to the server system 120 via the network 115. In one embodiment, the computer systems illustrated in environment 100 may include existing computer systems, e.g., desktop computers, server computers laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. Further, the computing systems disclosed herein may be under the control of one or more operating systems. Illustrative operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. However, the software applications described herein are not limited to any currently existing computing environment, operating system or programming language, and may be adapted to take advantage of new computing systems as they become available.

As shown, client computer systems 110 and 112 each include a CPU 102, storage 114 and memory 106, typically connected by a bus (not shown). CPU 102 is a programmable logic device that performs all the instruction, logic, and mathematical processing in a computer. Storage 104 stores application programs and data for use by client computer systems 110 and 112. Storage 104 includes hard-disk drives, flash memory devices, optical media and the like. The network 115 generally represents any kind of data communications network. Accordingly, the network 115 may represent both local and wide area networks, including the Internet. The client computer systems 110 and 112 are also shown to include a query tool 108. In one embodiment, the query tool 108 is software application that allows end users to access information stored in a database (e.g., database 140). Accordingly, the query tool 108 may allow users to compose and submit a query to a database system, which, in response, may be configured to process the query and return a set of query results. The query tool 108 may be configured to compose queries in a database query language, such as Structured Query Language (SQL). However, it should be noted that the query tool 108 is only shown by way of example; any suitable requesting entity may submit a query (e.g., another application, an operating system, etc.).

In one embodiment, the server system 120 includes a central processing unit (CPU) 122, storage 124, and memory 126. The storage 124 may represent one or more storage devices included in the server system 120, such as hard-disk drives, flash drives, optical drives, etc. However, storage 124 may represent any storage devices known in the art, such as drives included in computer systems in network communication with the server system 120, network-attached storage (NAS) devices, redundant arrays of independent disks (RAIDs), and the like. The storage 124 may store a database 140, which includes data 142, schema 144 and plan cache 148. The data 142 represents the substantive data stored by the database 140. The schema 144 represents the structure of the elements of the database 140 (i.e., tables, fields, keys, etc.). The plan cache 148 may be a data structure storing query plans generated by the query optimizer, as well as auxiliary data (e.g., temporary indexes, tables, etc.) used in generating query plans. The query plans and auxiliary data stored in the plan cache 148 may be used for optimizing subsequent queries, thus reducing the amount of processing required by the query optimizer 134. Further, the plan cache 148 may include historical data of past uses of the database 140 (e.g., most commonly-used queries, tables, indexes, etc.)

The memory 126 may include a database management system (DBMS) 130. The DBMS 130 provides a software application used to organize, analyze, and modify information stored in the database 140. The DBMS 130 includes a query engine 132, a query dispatcher 134, a query queue 136 and a query optimizer 138.

The query optimizer 138 may be configured to select an efficient query plan, or series of execution instructions, for executing a query submitted by a requesting application (e.g., a query generated using query tool 108). The query plan is submitted to the query engine 132 which may be configured to process database queries according to the respective query plans and to return a set of query results to the requesting application. As will the appreciated by those skilled in the art, the DBMS 130 may also include other query execution entities not shown in FIG. 1, such as a query parser, for example. In one embodiment, the query queue 136 is configured to stage queries for processing by the query engine 132. That is, as queries are submitted to the query engine 132, they may be stored within the query queue 136 until they are dispatched by the query dispatcher 134 for execution. In one embodiment, the query queue 136 may represent an abstract grouping of pending queries. For example, the query queue 136 may represent be a set of query requests that are defined as being associated, and that are waiting to be executed by the query engine 132.

In one embodiment, the query queue 136 may include device-specific queues, each corresponding to a different storage device included in storage 124. Each device-specific queue may stage queries that require access to data elements stored in the corresponding storage device. Optionally, the query queue 136 may include queues configured to store queries that require access to data elements stored on two (or more) storage devices.

In one embodiment, the query dispatcher 134 may be configured to manage the sequence/order and timing of query processing in order to reduce energy consumption. More specifically, the query dispatcher 134 may dispatch queries from device-specific queues that require access to data elements stored in the same storage device, such as a particular hard-disk drive. Further, the query dispatcher 134 may dispatch queries from each queue in turn, meaning that only the queries in one queue are dispatched at a given time. Accordingly, only one storage device is accessed at a time in order to retrieve the data elements required to execute the dispatched queries. For example, assume storage 124 comprises multiple hard-disk drives. Assume also that the query dispatcher 134 is dispatching queries from a first queue, which corresponds to a first drive. Thus, only that drive is required to be active for query execution at that time. After dispatching all queries in the first queue, the query dispatcher 134 dispatches the queries stored in a second queue, which corresponds to a second drive. Thus, the second drive is activated in order to retrieve the required data elements for executing the dispatched queries. The query dispatcher 134 may then continue until the queues corresponding to all drives in storage 124 are dispatched, and may then repeat the cycle by returning to dispatch the first queue. Thus, by only accessing one drive at a time, each drive is only active (i.e., spinning at a read-speed) during a certain portion of time, and is allowed to become inactive (i.e., to stop spinning) during the remaining time. Therefore, each drive is not being repeatedly spun up to read-speed (or maintained at read-speed) whenever a query requiring data elements stored on that drive is received. In this manner, the total electrical energy required to spin and/or cool the drives may be reduced.

In one embodiment, the query dispatcher 134 may represent an asynchronous task within the DBMS 130 that is dedicated to dispatching queries. However, the query dispatcher 134 may also represent an inbound task received by the DBMS 130 that is preempted to the task of dispatching queries. The query dispatcher 134 and query queue 136 are described in further detail below with reference to FIGS. 2A-2C.

Figure 2A:
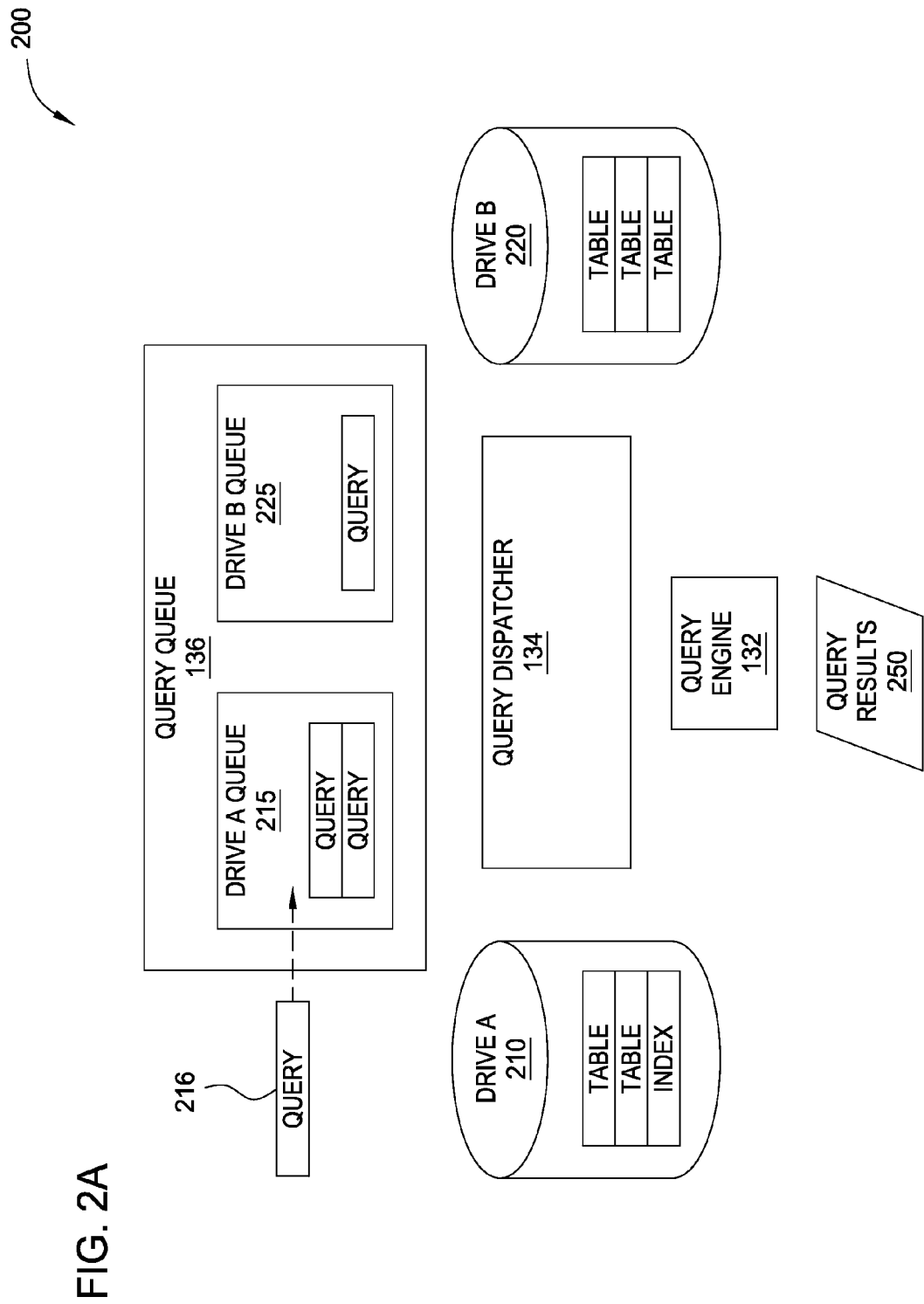
FIGS. 2A-2C are block diagrams illustrating the state of software components at various stages of query processing, according to one embodiment of the invention.
Figure 2B:
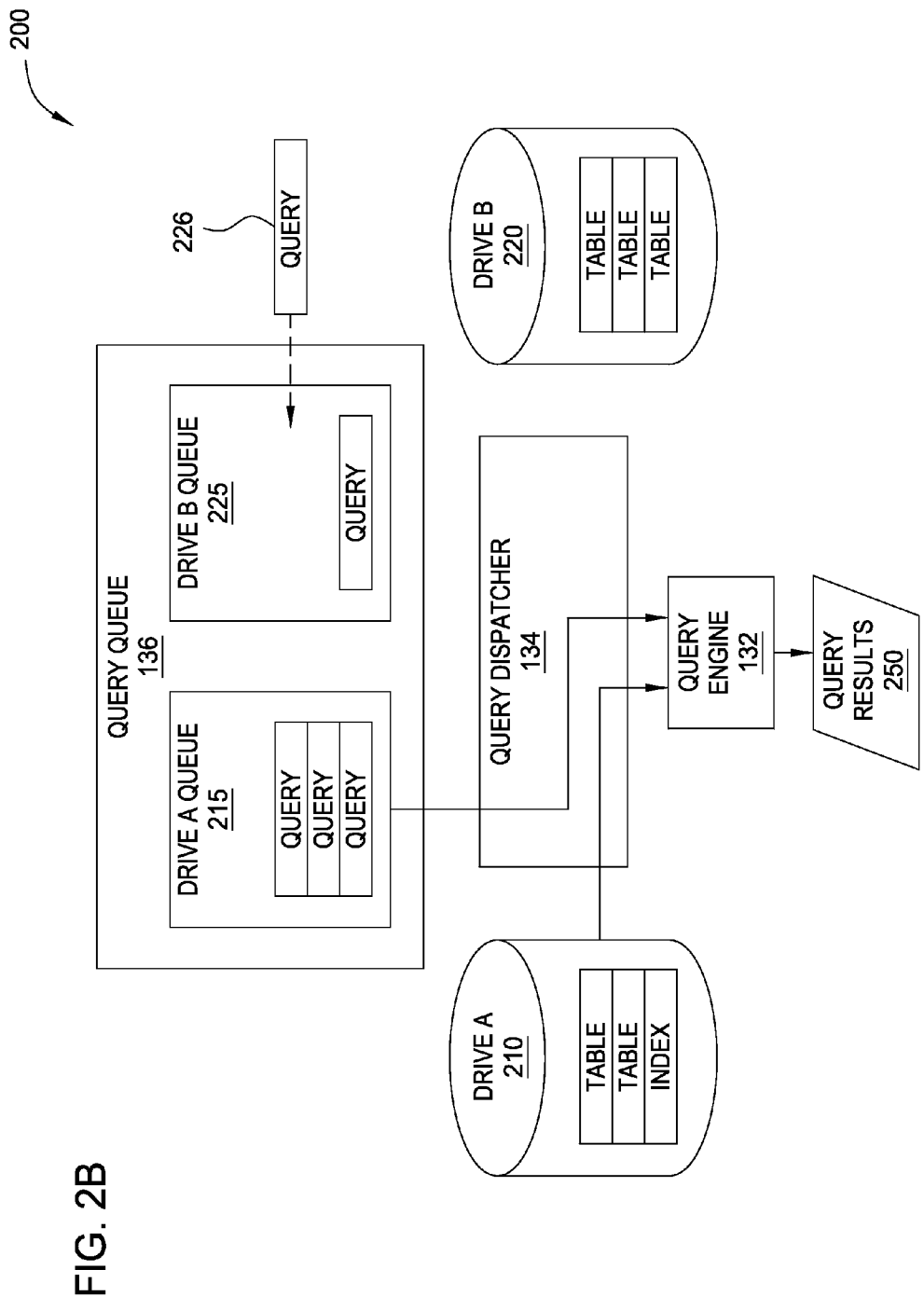
Figure 2C:
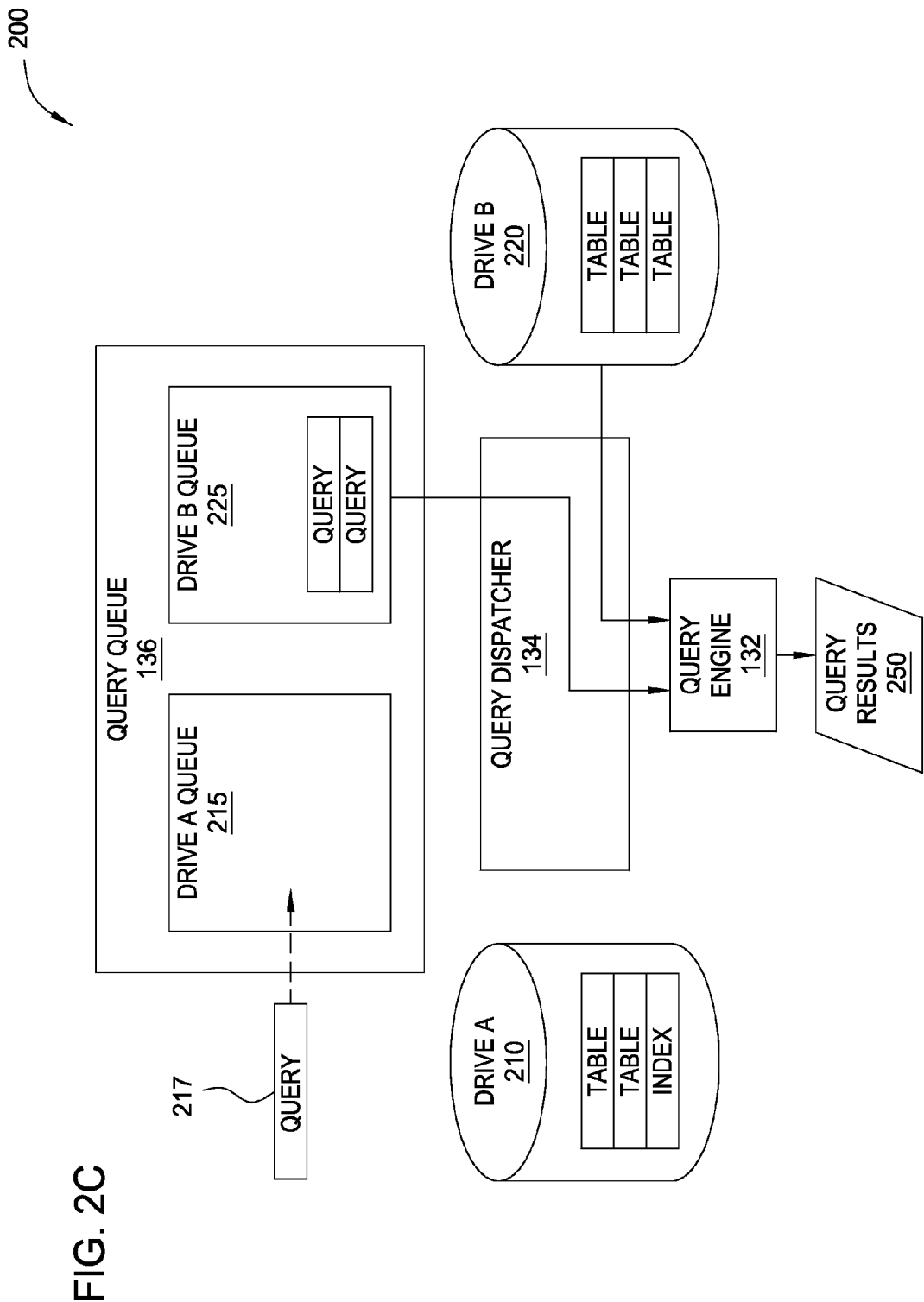

FIGS. 2A-2C are block diagrams 200 illustrating the state of software components at various stages of query processing, according to one embodiment of the invention. FIG. 2A illustrates an example of an initial stage of query processing. As shown, the query queue 136 may include drive A queue 215 (i.e., a device-specific queue), which may be configured to stage database queries requiring data elements (i.e., tales, indexes, etc.) stored on drive A 210. Assume an inbound query 216 is received by the DBMS 130 (shown in FIG. 1).

In one embodiment, the query dispatcher 134 is configured to identify which elements of the database 140 are required to execute the inbound query 216, and to determine the physical locations of the identified elements. For example, the query dispatcher 134 may analyze the plan cache 148 to identify any query plans that match the inbound query 216, to identify the elements of the database 140 used in executing the matching queries, and to determine the drive locations of the identified elements. In this example, assume the query dispatcher 134 determines that the inbound query 216 requires data elements stored on the drive A 210. Accordingly, the inbound query 216 is staged in the drive A queue 215 (as illustrated by the dotted arrow). However, in the event that no existing query plans match the received query, the plan cache 148 may not be used to determine the required database elements. Thus, a new query plan may be generated by the query optimizer 138, which may then be used to determine the required database elements.

FIG. 2B illustrates an example of a second stage of query processing, during which queries included in the drive A queue 215 are processed. As shown, the query dispatcher 134 may dispatch the queries staged in the drive A queue 215 to the query engine 132. In order to process these queries, the query dispatcher 134 may also transfer the relevant data from the drive A 210 to the query engine 132. In one embodiment, such a transfer requires that the drive A 210 be spun up to an appropriate read speed, thus consuming electrical energy. The query engine 132 may then process the queries and data, thus producing a set of query results 250. During this stage of query processing, assume another inbound query 226 is received by the DBMS 130, and is determined to require data elements stored in drive B 220. Thus, the inbound query 226 may be staged in the drive B queue 225.

In one embodiment, the second stage of query processing results in the queries staged in the drive A queue 215 being processed together, rather than being processed individually as each query is received by the DBMS 130. That is, by queuing and processing the queries according to drive requirements, the data elements stored on the drives are not accessed continuously, but are instead accessed only during the second stage illustrated in FIG. 2B. Thus, each hard-disk drive is only being spun while the corresponding query queue is being processed, and may remain idle during the rest of the time. For example, drive A 210 is only being spun while the drive A queue 215 is being processed (as shown in FIG. 2B). As a result, the total energy required for spinning the hard-disk drives may be reduced.

FIG. 2C illustrates an example of a third stage of query processing, during which queries staged in the drive B queue 225 are processed. As shown, the query dispatcher 134 may dispatch the queries staged in the drive B queue 225, as well as the associated data from the drive B 220, to the query engine 132. Thus, the drive B 220 must be spun up to an appropriate read speed. The query engine 132 may then process the queries and data, thus producing a new set of query results 260. As with the second stage of query processing described above, the third stage may be timed or triggered so as to efficiently group queries requiring access to Drive B 220 for reduced energy requirements.

Once the third stage of query processing (shown in FIG. 2C) is completed, the second stage and third stages may be repeated as required to process any subsequent queries received by the DBMS 130. For example, during the third stage of query processing, yet another inbound query 217 may be received by the DBMS 130, and may be determined to require data elements stored in drive A 210. Thus, as shown in FIG. 2C, the inbound query 217 is staged in the drive A queue 215, to be processed the next time that the drive A queue 215 is processed in the manner shown in FIG. 2B. Note that, while FIGS. 2A-2C show the query queue 136 as including two device-specific queues, it should be understood that embodiment of the invention may provide any number of device-specific queues.

In one embodiment, the query queue 136 may include queues configured to store queries that require access to data elements stored on two (or more) storage devices. For example, in the event that a query is received that requires access to elements of both drive A 210 and drive B 220, the query may be stored in a "drives A, B queue" (not shown). In this situation, the query dispatcher 134 may be configured to dispatch the queries stored in the "drives A, B queue" during a time period when both drive A 210 and drive B 220 are active. For instance, such a time period may represent an overlap after drive A 210 is exclusively active, and before drive B 220 becomes exclusively active. In another embodiment, any queries that require access to data elements stored on multiple drives may not be stored in query queue 136, but may instead be allowed to execute immediately as they are received by the DBMS 130.

In one embodiment, the timing of the stages shown in FIGS. 2A-2C may be based on a specified time period, thus allowing for an aggregation of queries during that time period. The time period may be based on a system setting, or may be specified by a user. Optionally, the time period may be automatically calculated based on past query performance. For example, the query dispatcher 134 may be configure to analyze historical data of past query executions in order to determine a time period that results in reduced energy use during query execution. In other embodiments, the timing of the stages may be based on staging a specified number of queries in a particular queue (e.g., the drive A queue 215). In any case, the triggering of each stage may be determined so as to accumulate queries in a manner that reduces the energy required for retrieving the data required for executing the queries. For example, such energy may be the electrical energy required for spinning the hard-disk drives storing the required data. In one embodiment, the amount of time that queries are queued may be limited according to a user preference. That is, since the execution time of a particular query will be delayed as long as the query is queued, it may be desirable to allow the user to specify a maximum time that a query may be queued. Further, in one embodiment, designated high priority queries are not queued. Instead, high priority queries may bypass the queues. High priority queries may be designated according to the particular user (i.e., some users are designated as "power users" who are given higher priority relative to other users), or on a per query level (e.g., an attribute associated with the query).

In one embodiment, the DBMS 130 may be configured to determine the amount of energy saved by the use of the query dispatcher 134 and the query queue 136. This determination may be based on a comparison between the energy required to execute the queries after being queued and dispatched, and the energy that would have been required to execute each query upon being received by the DBMS 130. Such energy calculations may be based on analysis of historical data of previously executed queries (e.g., analysis of the plan cache 148). Once determined, the amount of energy saved may be presented to a user in order to provide feedback of the energy efficiency using current system settings. For example, the amount of energy saved may be displayed to a user in the query interface 108.

Figure 3:
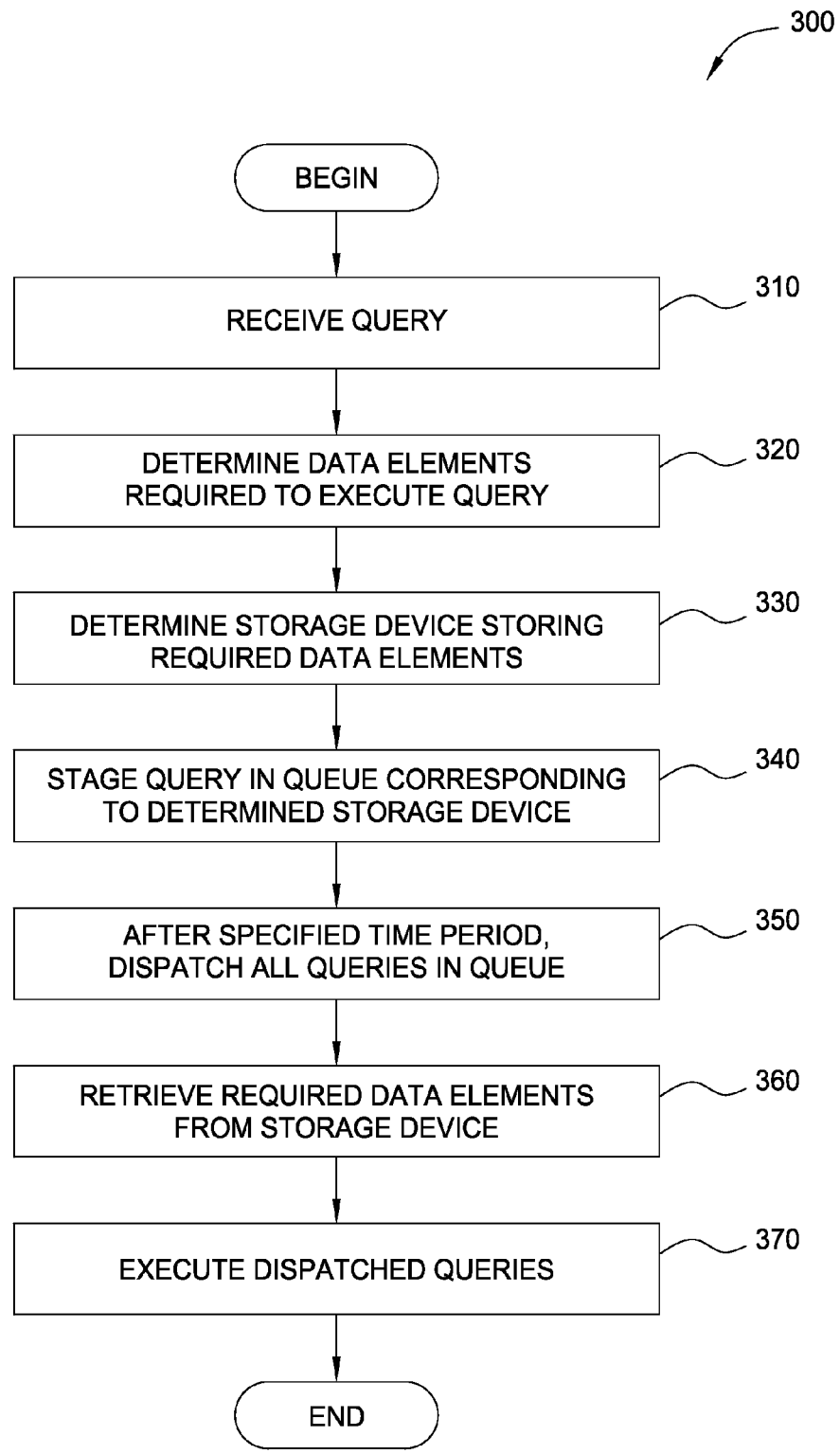
FIG. 3 is a flow diagram illustrating a method for energy-efficient query dispatching, according to one embodiment of the invention.

FIG. 3 is a flow diagram illustrating a method 300 for energy-efficient query dispatching, according to one embodiment of the invention. Persons skilled in the art will understand that, even though the method is described in conjunction with the system of FIG. 1, any system configured to perform the steps of method 300, in any order, is within the scope of the present invention.

The method 300 begins at step 310, when a database query is received. For example, a query may be created by a user interacting with a query tool 108, and may be received by a DBMS 130 on a server system 120. At step 320, a set of data elements required to execute the received query are determined. For example, as shown in FIG. 1, the query dispatcher 134 may be configured to determine the elements of the database 140 are required to execute the received query. This determination may be performed by matching the received query to query plans stored in a plan cache 148. However, if no existing query plans match the received query, a new query plan may be generated by the query optimizer 138.

At step 330, a storage device storing the required data elements may be determined. The storage device may be, e.g., a particular hard-disk drive included in the server system 120. At step 340, the query may be staged in a queue corresponding to the determined storage device (i.e., a device-specific queue). The received query may be kept in the queue for a specified time period, along with other queries requiring the same database elements. For example, as shown in FIG. 2A, the query 216 may be determined to require the elements of database 140 that are stored in the drive A 210. Accordingly, the query is added to the drive A queue 215, which is configured to stage any queries that require access to the elements stored on drive A 210.

At step 350, after waiting for the specified time period, the queries staged in the queue may be dispatched together for execution. At step 360, the required data elements may be retrieved from the storage device. At step 370, the dispatched queries are executed, using the required data elements as query inputs. For example, as shown in FIG. 2B, the query dispatcher 134 may be configured to dispatch the queries kept in the drive A queue 215, along with the required data elements from drive A 210. The queries are dispatched to the query engine 132 and are executed using the required data elements as inputs, thus producing a set of query results 250. The query results 250 may be presented to a user in the query tool 108. After step 370, the method 300 terminates.

Figure 4:
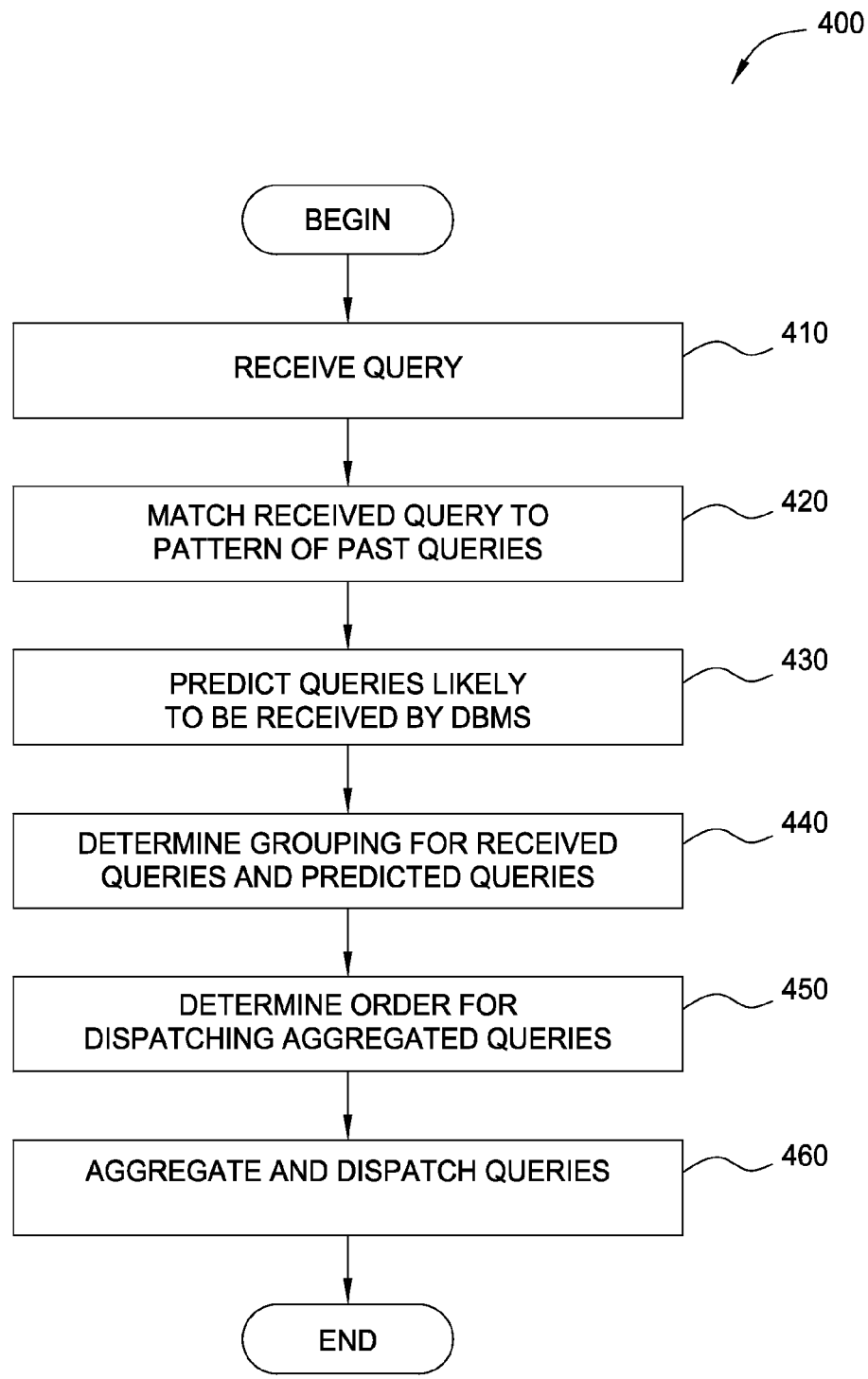
FIG. 4 is a flow diagram illustrating a method for aggregating received queries and predicted queries for execution, according to one embodiment of the invention.

FIG. 4 is a flow diagram illustrating a method 400 for aggregating received queries and predicted queries for execution, according to one embodiment of the invention. Persons skilled in the art will understand that, even though the method is described in conjunction with the system of FIG. 1, any system configured to perform the steps of method 400, in any order, is within the scope of the present invention.

The method 400 begins at step 410, when a database query is received. For example, a query may be created by a user interacting with a query tool 108, and may be received by a DBMS 130 on a server system 120. Optionally, the DBMS 130 may receive multiple database queries within a specified time period.

At step 420, the received query is matched to patterns of past queries executed by the database 140. That is, characteristics of the received query (e.g., query conditions, time of receipt of query, user/process issuing the query, etc.) may be matched to historical data describing queries previously executed by DBMS 130. At step 430, any matches between the received query and patterns of past queries are used to predict a set of subsequent queries which are likely to be received by the database. Further, in the event that multiple queries are received by the DBMS 130, the sequence of received queries may be matched to the patterns of past queries.

For example, referring to FIG. 1, the query dispatcher 134 may be configured to compare a received query (or queries) to query plans stored in the plan cache 148 in order to match to patterns of past queries. Assume the database 140 may store operations data for a given company. Assume further that the received query is received on the last day of the month, and is issued by an accounting department of the company. Also assume that a similar query is usually received on the last day of every month, is issued by the accounting department, and is usually followed by queries of payroll data. In this situation, the query dispatcher 134 may be configured to match the received query to the pattern of past queries, and thus predict that a query of payroll data will be next to be received by the DBMS 130.

At step 440, a grouping may be determined for aggregating the previously-received queries with the predicted subsequent queries. More specifically, received and predicted queries may be grouped according to data elements required to execute the queries. For example, the query dispatcher 134 may be configured to determine the data elements required to execute each query, and also to determine a storage device storing the required data elements.

At step 450, an order may be determined for dispatching the aggregated queries for execution. That is, once the predicted queries are received, and are aggregated with the previously-received queries, they may be dispatched according to a determined order. In particular, the order may be determined so as to minimize the amount of data transferred from storage 124 to memory 126, thus reducing the energy required to retrieve the data elements. For example, the query dispatcher 134 may be configured to determine an efficient order for dispatching the aggregated queries.

At step 460, queries are aggregated and dispatched for execution. That is, once the predicted queries are received, they are aggregated with the previously-received queries, according to the grouping determined in step 440. Once aggregated, the queries are then dispatched according to the order determined in step 450. For example, the received queries may be staged in the query queue 136, (shown in FIG. 1). Further, the queued queries may be dispatched by the query dispatcher 134 to be executed by the query engine 132. However, in the event that predicted queries are not received within a specified time, any queries staged for aggregation may be released from the query queue 136, and may then be dispatched for execution without following any particular order. After step 460, the method 400 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   receiving a database query;
   determining at least one data element required for executing the database query;
   identifying, from a plurality of storage devices, a storage device storing the determined at least one data element;
   adding the received database query to a first queue of a plurality of queues each having a plurality of queued queries, each of the queues having a predefined association with a respective storage device of the plurality of storage devices, wherein the predefined association of the first queue is a first predefined association with the identified storage device storing the determined at least one data element, wherein each of the queued queries of a given of one of the queues requires one or more data elements stored in the respective storage device in order to be executed, wherein each queued query is received during a specified time period, and wherein the specified time period is selected according to an energy consumption objective; and after the specified time period:
- dispatching the plurality of queued queries from the first queue;
- retrieving, from the respective storage device, data elements required for executing the dispatched queries; and
- executing the dispatched queries, using the retrieved data elements as inputs.

2. The computer-implemented method of claim 1, further comprising:
- returning a set of query results; and
- powering down the respective storage device.

3. The computer-implemented method of claim 1, wherein the storage device is a hard-disk drive.

4. The computer-implemented method of claim 3, wherein the energy consumption objective is directed to minimizing a number of times the hard-disk drive spins up to a predefined read speed.

5. The computer-implemented method of claim 1, wherein determining at least one data element comprises analyzing a history of query plans previously performed on the database.

6. The computer-implemented method of claim 1, wherein determining at least one data element comprises generating a new query plan for performing the received query.

7. The computer-implemented method of claim 1, wherein the at least one data element comprises at least one of: (i) a table of a database, and (ii) an index of a database.

8. The computer-implemented method of claim 1, further comprising:
- determining an amount of energy savings for executing the dispatched queries rather that executing the same queries as they are received; and
- presenting the determined amount to a user.

9. A computer readable storage medium containing a program which, when executed, performs an operation, comprising:
- receiving a database query;
- determining at least one data element required for executing the database query;
- identifying, from a plurality of storage devices, a storage device storing the determined at least one data element;
- adding the received database query to a first queue of a plurality of queues each having a plurality of queued queries, each of the queues having a predefined association with a respective storage device of the plurality of storage devices, wherein the predefined association of the first queue is a first predefined association with the identified storage device storing the determined at least one data element, wherein each of the queued queries of a given of one of the queues requires one or more data elements stored in the respective storage device in order to be executed, wherein each queued query is received during a specified time period, and wherein the specified time period is selected according to an energy consumption objective; and
- after the specified time period:
  - dispatching the plurality of queued queries from the first queue;
  - retrieving, from the respective storage device, data elements required for executing the dispatched queries; and
  - executing the dispatched queries, using the retrieved data elements as inputs.

10. The computer readable storage medium of claim 9, further comprising:
- returning a set of query results; and
- powering down the respective storage device.

11. The computer readable storage medium of claim 9, wherein the storage device is a hard-disk drive.

12. The computer readable storage medium of claim 11, wherein the energy consumption objective is directed to minimizing a number of times the hard-disk drive spins up to a predefined read speed.

13. The computer readable storage medium of claim 9, wherein determining at least one data element comprises analyzing a history of query plans previously performed on the database.

14. The computer readable storage medium of claim 9, wherein determining at least one data element comprises generating a new query plan for performing the received query.

15. The computer readable storage medium of claim 9, wherein the at least one data element comprises at least one of: (i) a table of a database, and (ii) an index of a database.

16. The computer readable storage medium of claim 9, further comprising:
- determining an amount of energy savings for executing the dispatched queries rather that executing the same queries as they are received; and
- presenting the determined amount to a user.

17. A system, comprising:
- a database;
- a processor; and
- a memory containing a program, which when executed by the processor is configured to perform an operation, comprising:
  - receiving a database query;
  - determining at least one data element required for executing the database query;
  - identifying, from a plurality of storage devices, a storage device storing the determined at least one data element;
  - adding the received database query to a first queue of a plurality of queues each having a plurality of queued queries, each of the queues having a predefined association with a respective storage device of the plurality of storage devices, wherein the predefined association of the first queue is a first predefined association with the identified storage device storing the determined at least one data element, wherein each of the queued queries of a given of one of the queues requires one or more data elements stored in the respective storage device in order to be executed, wherein each queued query is received during a specified time period, and wherein the specified time period is selected according to an energy consumption objective; and
  - after the specified time period:
    - dispatching the plurality of queued queries from the first queue;
    - retrieving, from the respective storage device, data elements required for executing the dispatched queries; and
    - executing the dispatched queries, using the retrieved data elements as inputs.

18. The system of claim 17, wherein the storage device is a hard-disk drive.

19. The system of claim 18, wherein the energy consumption objective is directed to minimizing a number of times the hard-disk drive spins up to a predefined read speed.

20. The system of claim 17, wherein determining at least one data element comprises analyzing a history of query plans previously performed on the database.

* * * * *